US009690421B2

United States Patent
Chang et al.

(10) Patent No.: US 9,690,421 B2
(45) Date of Patent: Jun. 27, 2017

(54) TOUCH SYSTEM USING PROCESSOR TO CONFIGURE TOUCH DETECTION ARCHITECTURE

(71) Applicant: Rich IP Technology Inc., Taipei (TW)

(72) Inventors: Jen-Chieh Chang, Taipei (TW); Chung-Lin Chia, Taipei (TW); Han-Chang Chen, Taipei (TW); Yen-Hung Tu, Taipei (TW); Chih-Wen Wu, Taipei (TW)

(73) Assignee: RICH IP TECHNOLOGY INC., Taipei (TW)

(*) Notice: Subject to any disclaimer, the term of this patent is extended or adjusted under 35 U.S.C. 154(b) by 72 days.

(21) Appl. No.: 14/886,016

(22) Filed: Oct. 17, 2015

(65) Prior Publication Data

US 2016/0170554 A1 Jun. 16, 2016

(30) Foreign Application Priority Data

Dec. 15, 2014 (TW) .............................. 103143663 A (51) Int. Cl.
*G06F 3/041* (2006.01)
(52) U.S. Cl.
CPC .......... *G06F 3/0416* (2013.01); *G06F 3/0412* (2013.01)
(58) Field of Classification Search
CPC .............................. G06F 3/0412; G06F 3/0416
See application file for complete search history.

(56) References Cited

U.S. PATENT DOCUMENTS

| | | | | |
|---|---|---|---|---|
| 5,880,411 A * | 3/1999 | Gillespie | ............. | G06F 3/03547 178/18.01 |
| 7,859,512 B2 * | 12/2010 | Yuasa | ................... | G02F 1/1347 345/107 |
| 7,916,127 B2 * | 3/2011 | Wang | .................... | G06F 3/0416 178/18.01 |
| 9,442,144 B1 * | 9/2016 | Ryshtun | ............... | H03K 17/962 |
| 2009/0050376 A1 * | 2/2009 | Jeon | ....................... | G06F 3/0416 178/18.03 |
| 2010/0097328 A1 * | 4/2010 | Simmons | .............. | G06F 3/0416 345/173 |
| 2011/0234523 A1 * | 9/2011 | Chang | ..................... | G06F 3/044 345/173 |
| 2012/0235937 A1 * | 9/2012 | Sleeman | ............... | G06F 3/0416 345/173 |

* cited by examiner

*Primary Examiner* — Andrew Sasinowski
*Assistant Examiner* — Chun-Nan Lin
(74) *Attorney, Agent, or Firm* — Guice Patents PLLC (57) ABSTRACT

A touch system using a processor to configure a touch detection architecture and including a sensor unit, a connection unit, a touch scan unit, a touch detection unit, and a processor unit. The sensor unit has a plurality of sensors. The connection unit determines a sensors-joined configuration of the plurality of sensors according to at least one connection control signal. The touch scan unit coupling at least one touch signal to the connection unit according to at least one scan configuration signal. The touch detection unit outputting the touch signal and deriving touch information from a parameter of the touch signal according to at least one operation mode configuration signal. The processor unit outputting the at least one connection control signal, the scan configuration signal, and the operation mode configuration signal according to a content of a control table, and receiving the touch information.

17 Claims, 8 Drawing Sheets

| SENSOR UNIT IMPLEMENTED USING EXISTING DISPLAY STRUCTURE |
|---|

TOUCH SYSTEM USING PROCESSOR TO CONFIGURE TOUCH DETECTION ARCHITECTURE

BACKGROUND OF THE INVENTION

Field of the Invention

The present invention relates to a touch system, especially to a touch system using a processor to configure a touch detection architecture.

Description of the Related Art

Figure 1:
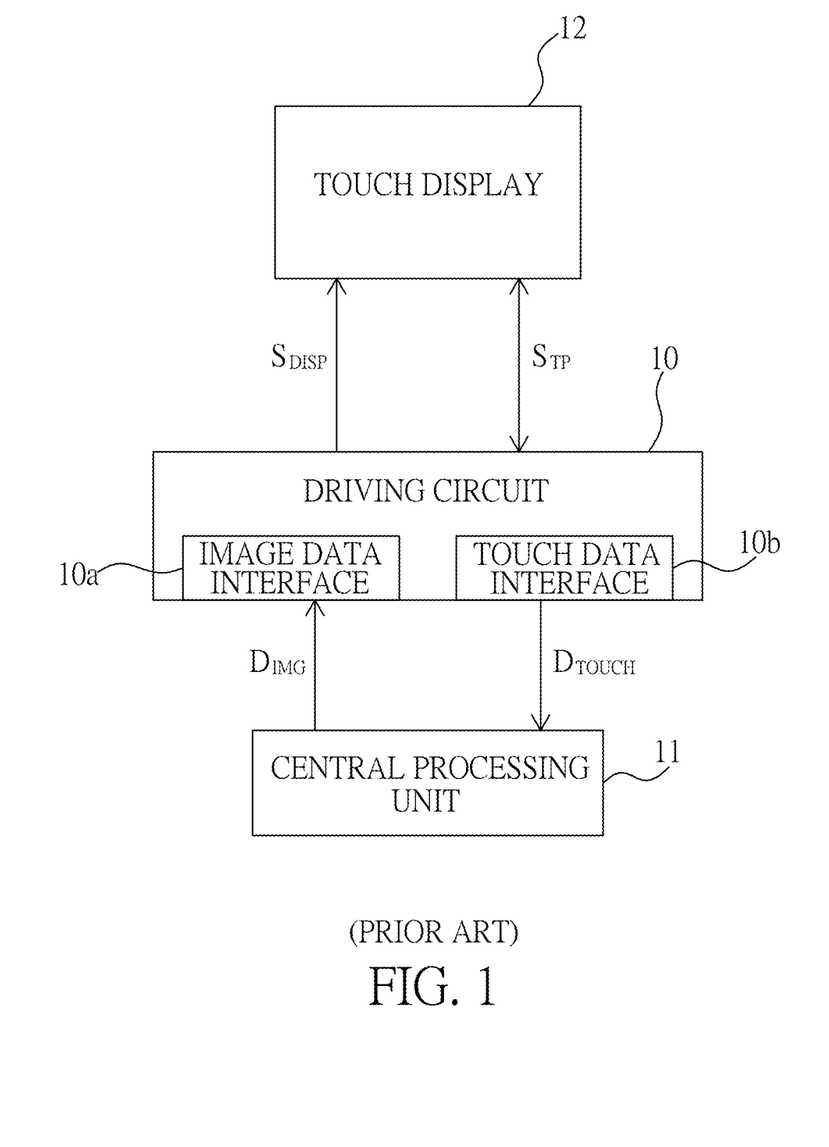
FIG. 1 illustrates a block diagram of a touch display of prior art.

Please refer to FIG. 1, which illustrates a block diagram of a touch display of prior art. As illustrated in FIG. 1, a driving circuit 10 having a microprocessor or a microcontroller receives pixel data $D_{IMG}$ from a central processing unit 11 via an image data interface 10a, and then generates pixel driving signals $S_{DISP}$ according to the pixel data $D_{IMG}$ to drive a touch display 12 to show a display. Besides, the driving circuit 10 drives the touch display 12 with touch signals $S_{TP}$ to derive touch coordinate data $D_{TOUCH}$, and then transmits the touch coordinate data $D_{TOUCH}$ to the central processing unit 11 via a touch data interface 10b.

When used in touch applications of simple touch functions or small sizes, the microprocessor or microcontroller of the driving circuit 10 needs not to be very powerful to handle required workload. However, when required touch functions become complex, the microprocessor or microcontroller of the driving circuit 10 may not be able to afford the corresponding heavy workload. One solution is to use a powerful microprocessor or microcontroller to replace a common microprocessor or microcontroller. However, this arrangement will increase the cost of the driving circuit 10 substantially, leaving the resultant touch product in a disadvantageous place in the competing market.

To solve the foregoing problem, a novel touch system is needed.

SUMMARY OF THE INVENTION

One objective of the present invention is to disclose a touch system using a processor to configure a touch detection architecture, which is capable of determining a sensors joined configuration of a plurality of sensors of a sensor unit according to a control table.

Another objective of the present invention is to disclose a touch system using a processor to configure a touch detection architecture, which is capable of determining a scan address range and a scan mode of a touch scan unit according to the control table, the scan address range being corresponding to an addressing space of the sensors joined configuration of the sensor unit.

Another objective of the present invention is to disclose a touch system using a processor to configure a touch detection architecture, which is capable of determining an operation mode of a touch detection unit according to the control table to derive touch information.

Still another objective of the present invention is to disclose a touch system using a processor to configure a touch detection architecture, which is capable of using a touch control unit to deliver respective control signals to the sensor unit, the touch scan unit, and the touch detection unit to perform an adaptive touch detection procedure.

To attain the foregoing objectives, a touch system using a processor to configure a touch detection architecture is proposed, including:

a sensor unit having a plurality of sensors;

a connection unit, having a plurality of switches and at least one common contact, each of the plurality of switches having a control end, a first connection end, and a second connection end, wherein, each the control end is coupled with a connection control signal, each the first connection end is coupled with one of the plurality of sensors, and each the common contact is coupled with a plurality of the second connection ends;

a touch scan unit, having at least one scan control end, at least one first signal connection end, a plurality of second signal connection ends, and at least one third signal connection end, the at least one scan control end being coupled with at least one scan configuration signal, each the first signal connection end being coupled with a touch signal, the plurality of second signal connection ends being coupled to the first connection ends of the connection unit, and the at least one third signal connection end being coupled to the at least one common contact of the connection unit, wherein, each the first signal connection end is coupled to one of the plurality of second signal connection ends or one of the at least one third signal connection end under a control of the at least one scan configuration signal;

a touch detection unit, having at least one operation mode control end, at least one touch detection end, and at least one touch information output end, the at least one operation mode control end being coupled with at least one operation mode configuration signal, each the touch detection end being used to output the touch signals and derive a parameter from each of the touch signals, and the at least one touch information output end being used to output touch information, wherein the touch information is generated according to the parameter from each of the touch signals; and a processor unit, used to output the at least one connection control signal, the at least one scan configuration signal, and the at least one operation mode configuration signal according to a content of a control table, and receive the touch information.

In one embodiment, the plurality of sensors of the sensor unit are disposed in a two-dimensional array.

In one embodiment, the switches of the connection unit are implemented by transistors.

In one embodiment, the parameter is selected from a group consisting of voltage, current, frequency, and phase, and the touch information is derived by performing an analog-to-digital conversion on the parameter.

In one embodiment, the touch information is derived by performing an analog-to-digital conversion and a touch decision procedure on the parameter.

In one embodiment, the control table includes at least one block division byte and at least one enable/disable byte.

In one embodiment, the control table has a content determined according to a control algorithm.

In one embodiment, the control algorithm determines the content of the control table according to a graphic user interface.

In one embodiment, the control algorithm determines the content of the control table according to at least one piece of the touch information.

In one embodiment, the touch scan unit determines a scan mode according to a content of the at least one scan configuration signal, the scan mode being selected from a group consisting of a sequential scan mode, a parallel scan mode, and an addressing scan mode.

In one embodiment, the touch detection unit performs a touch detection procedure determined by a content of the at least one operation mode configuration signal, the touch detection procedure being selected from a group consisting of a self-capacitive detection procedure, a mutual-capacitive detection procedure, a photo interrupt detection procedure, a pressure change detection procedure, a resistance change detection procedure, a frequency change detection procedure, and a hybrid signal detection procedure.

In one embodiment, the control table further includes at least one detection sensitivity setting byte for controlling a detection sensitivity profile of the touch detection unit via determining a content of the at least one operation mode configuration signal.

In one embodiment, the control table further includes at least one byte for setting detection weightings.

In one embodiment, the control table further includes at least one byte for setting a number of repeating detection times.

In one embodiment, the sensor unit is within a display.

In one embodiment, the sensor unit is implemented by using a plurality of display electrodes or a plurality of signal conducting lines of the display.

In one embodiment, the sensor unit is integrated with a display to form a touch display.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 4b illustrates an embodiment of a driving circuit of the sensor unit of FIG. 4a.

DETAILED DESCRIPTION OF THE PREFERRED EMBODIMENTS

Figure 2:
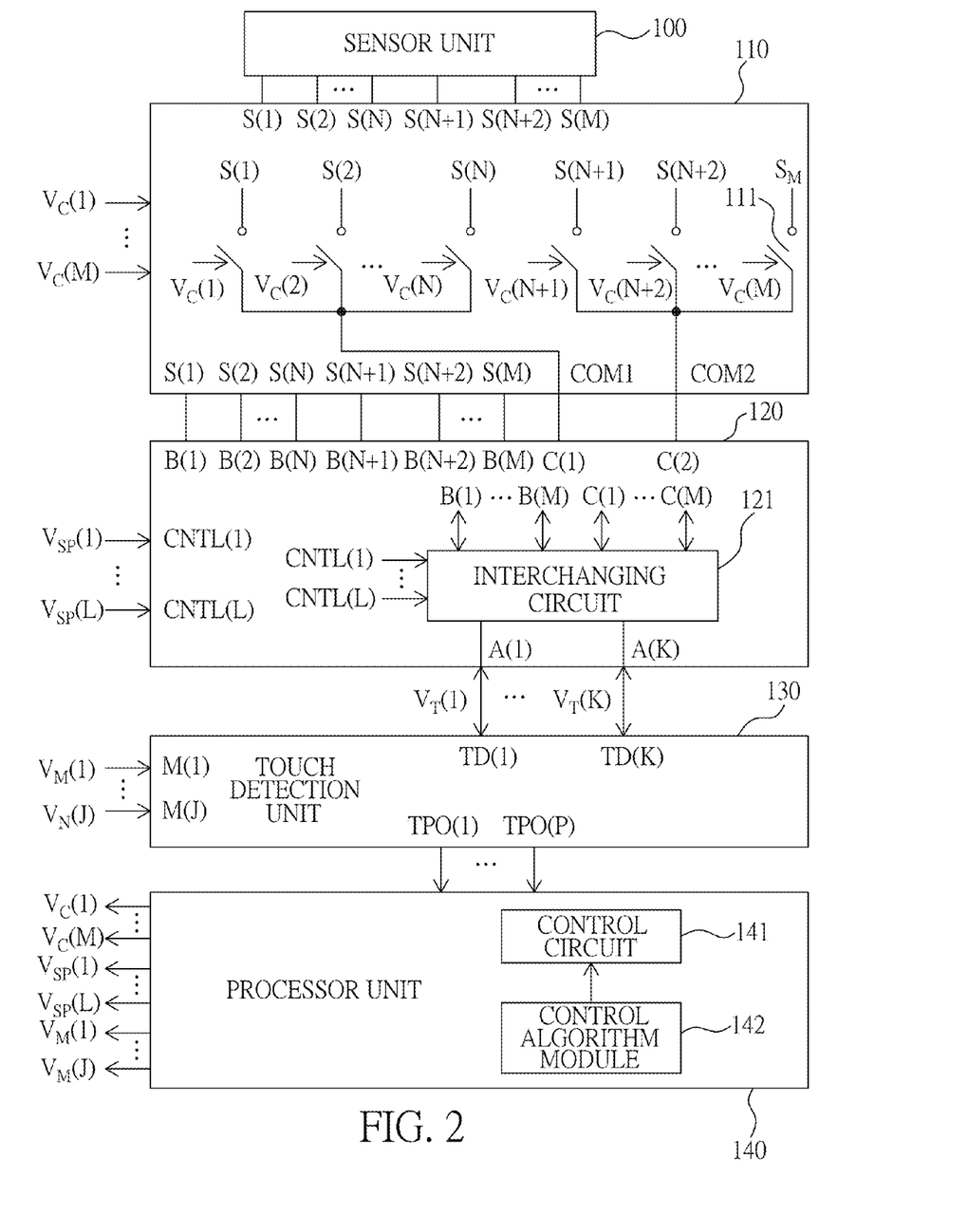
FIG. 2 illustrates a block diagram of a touch system using processor to configure a touch detection architecture according to an embodiment of the present invention.

Please refer to FIG. 2, which illustrates a block diagram of a touch system using processor to configure a touch detection architecture according to an embodiment of the present invention. As illustrated in FIG. 2, the touch system has a sensor unit 100, a connection unit 110, a touch scan unit 120, a touch detection unit 130, and a processor unit 140.

The sensor unit 100 has a plurality of sensors, which can be disposed in a row or a two-dimensional array. The sensor unit 100 can be a resistive type sensing unit, a capacitive type sensing unit, a photo type sensing unit, an electromagnetic type sensing unit, a force sensing unit, or a surface acoustic wave type sensing unit. Besides, when the sensor unit 100 is a capacitive type sensing unit, it can be implemented by placing additional electrodes in a display, or by existing display electrodes or existing signal conducting lines of a display, or by an independent capacitive touch module (which is combined with a display to form a touch display).

The connection unit 110 has a plurality of switches 111 (which can be implemented by transistors and can be incorporated in an integrated circuit or placed on a same substrate plate with the sensor unit 100) and at least one common contact (COM1-COM2), each the switch 111 has a control end, a first connection end (one of S(1)-S(M)), and a second connection end, wherein, each the control end is coupled with one of the connection control signals $V_C(1)$-$V_C(M)$, M being a positive integer; each the first connection end is coupled with one of the sensors of the sensor unit 100; and each the common contact is coupled with a plurality of the second connection ends. When in operation, the connection unit 110 can determine a sensors joined configuration of the sensors of the sensor unit 100 under a control of the connection control signals $V_C(1)$-$V_C(M)$.

The touch scan unit 120 has at least one scan control end (CNTL(1)-CNTL(L), L is a positive integer), at least one first signal connection end (A(1)-A(K), K is a positive integer), a plurality of second signal connection ends (B(1)-B(M)), at least one third signal connection end (C(1)-C(2)), and an interchanging circuit 121, wherein, the at least one scan control end is coupled with at least one scan configuration signal ($V_{SP}(1)$-$V_{SP}(L)$), each the first signal connection end is coupled with a touch signal (one of the $V_T(1)$-$V_T(K)$), the second signal connection ends B(1)-B(M) are coupled to the first connection ends S(1)-S(M) of the connection unit 110, and the at least one third signal connection end is coupled to the at least one common contact (COM1-COM2) of the connection unit 110. When in operation, the interchanging circuit 121 will couple each of the at least one first signal connection end to one of the second signal connection ends or one of the at least one third signal connection end according to a content of the scan configuration signals $V_{SP}(1)$-$V_{SP}(L)$, so that the touch scan unit 120 can determine a scan mode according to the content of the scan configuration signals $V_{SP}(1)$-$V_{SP}(L)$, wherein the scan mode can be a sequential scan mode, a parallel scan mode, or an addressing scan mode. When the touch scan unit 120 operates in the addressing scan mode, a scan address range is determined, and the scan address range is preferably corresponding to an addressing space of the sensors joined configuration of the sensor unit 100.

The touch detection unit 130 has at least one operation mode control end (M(1)-M(J), J is a positive integer), at least one touch detection end (TD(1)-TD(K)), and at least one touch information output end (TPO(1)-TPO(P), P is a positive integer), the at least one operation mode control end being coupled with at least one operation mode configuration signal $V_M(1)$-$V_M(J)$, each the touch detection end being used to output the touch signal and derive a parameter of the touch signal, and the at least one touch information output end being used to output touch information generated according to the parameter, the parameter being selected from a group consisting of voltage, current, frequency, and phase, and the touch information including raw data or touch coordinate data, wherein, the raw data is derived by performing an analog-to-digital conversion on the parameter, and the touch coordinate data is derived by performing a touch decision procedure on the raw data. During the touch decision procedure, the raw data will compare with a threshold to determine the touch coordinate data. Besides, the touch detection unit 130 can perform a touch detection procedure corresponding to a type of the sensor unit 100 under the control of a content of the at least one operation mode configuration signal $V_M(1)$-$V_M(J)$, wherein the touch detection procedure can be a self-capacitive detection procedure, a mutual-capacitive detection procedure, a photo interrupt detection procedure, a pressure change detection procedure, a resistance change detection procedure, a frequency change detection procedure, or a hybrid signal detection procedure (the hybrid signal consists of a pixel gray signal and a touch detection signal).

The processor unit 140 is used to output the at least one connection control signal $V_C(1)$-$V_C(M)$, the at least one scan configuration signal $V_{SP}(1)$-$V_{SP}(L)$, and the at least one operation mode configuration signal $V_M(1)$-$V_M(J)$ according to a content of a control table 141, and receive the touch information. The control table 141 preferably includes at least one block division byte and at least one enable/disable byte, wherein the at least one block division byte is used to determine a content of the at least one connection control signal $V_C(1)$-$V_C(M)$ to form a sensors joined configuration of the sensor unit 100, and the at least one enable/disable byte is used to determine a content of the at least one scan configuration signal $V_{SP}(1)$-$V_{SP}(L)$ to define a scan space of the sensor unit 100. Besides, the control table 141 can also include: at least one detection sensitivity setting byte for controlling a detection sensitivity profile of the touch detection unit 130 via determining a content of the at least one operation mode configuration signal $V_M(1)$-$V_M(J)$; at least one byte for setting a detection weighting profile of the touch detection unit 130; and at least one byte for setting a repeating-detection-times profile of the touch detection unit 130. Therefore, the present invention is capable of defining a scan space of the sensor unit 100 as required, and independently determining each sensing region of the scan space to have a same or different area, a same or different detection sensitivity, a same or different detection weighting, and a same or different repeating-sensing-times, so as to meet different touch requirements.

Besides, the control table 141 has a content determined according to a control algorithm of a control algorithm module 142, and the control algorithm can be generated according to a graphic user interface, or the at least one piece of the touch information. For example, the control algorithm can determine a content of the control table 141 according to a previous piece of the touch information, or an operational trend derived from previous pieces of the touch information. Besides, codes of the control algorithm module 142 and the content of the control table can be stored in a same memory or different memories.

Figure 3A:
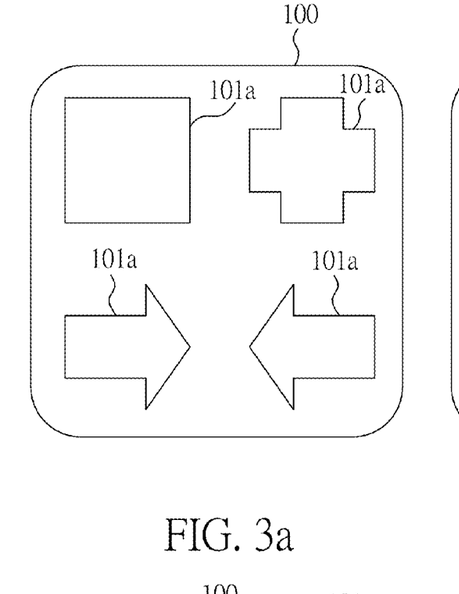
FIG. 3a-3f illustrate embodiments of the sensor unit of FIG. 2 using passive sensing structures.
Figure 3B:
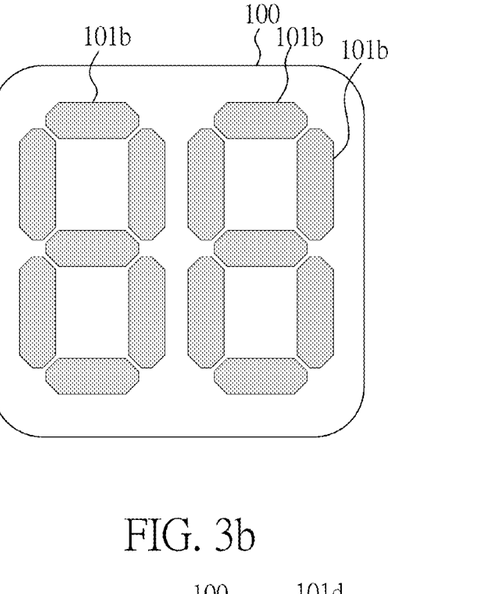
Figure 3C:
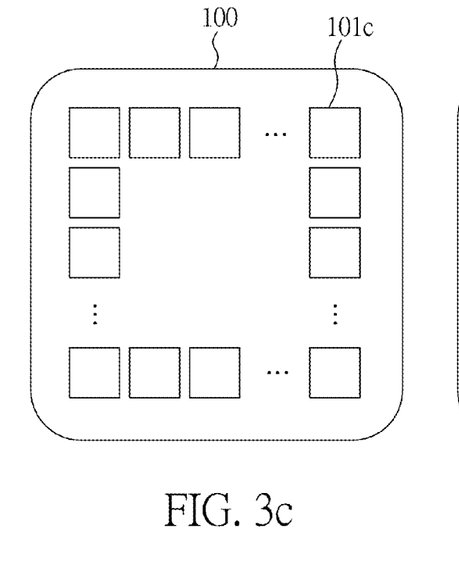
Figure 3D:
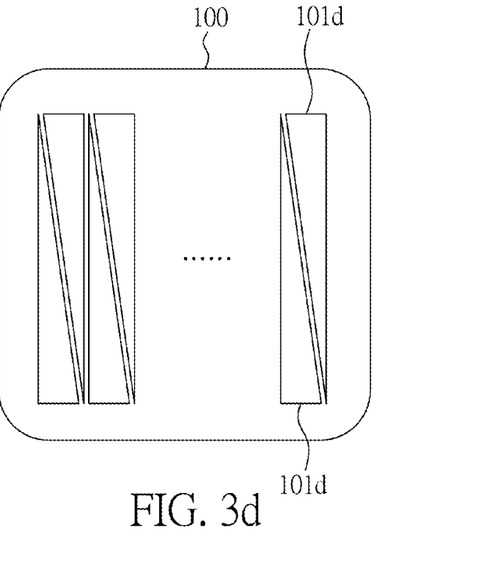
Figure 3E:
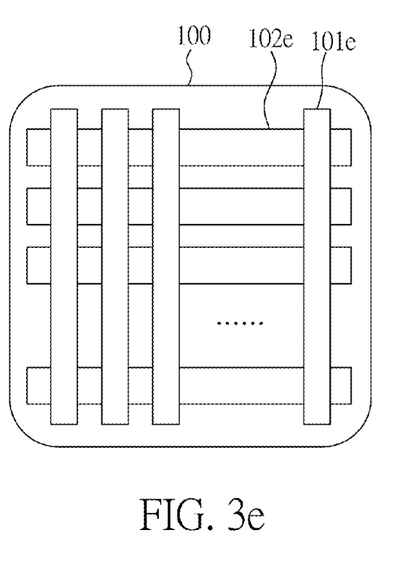
Figure 3F:
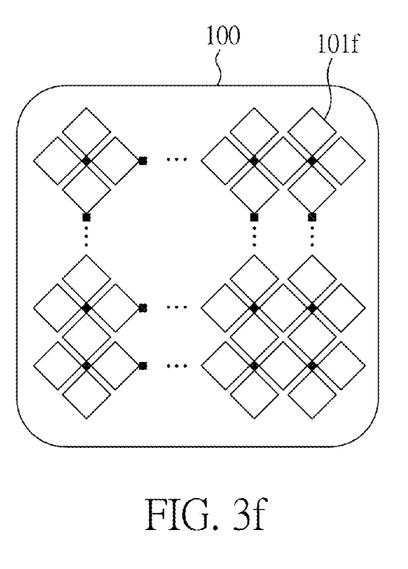

With the structure of FIG. 2, the present invention can fulfill multiple touch requirements. Please refer to FIG. 3a-3f, which illustrate multiple embodiments of the sensor unit 100 of the present invention in passive sensing structures. In FIG. 3a, the sensor unit 100 includes a plurality of sensors 101a of different shapes; in FIG. 3b, the sensor unit 100 includes a plurality of sensors 101b forming two digit figures; in FIG. 3c, the sensor unit 100 includes a plurality of sensors 101c forming a two-dimensional array; in FIG. 3d, the sensor unit 100 includes a plurality of sensors 101d forming a one-dimensional array; in FIG. 3e, the sensor unit 100 includes a plurality of sensors 101e and a plurality of sensors 102e forming a two-layer X-Y array; and in FIG. 3f, the sensor unit 100 includes a plurality of sensors 101f forming a single-layer polar-coordinate sensing plane.

Figure 4A:
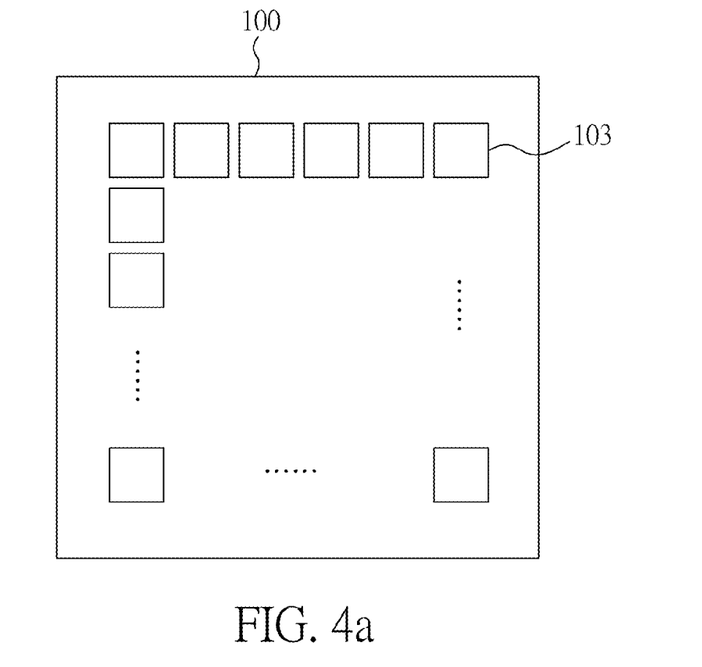
FIG. 4a illustrates an embodiment of the sensor unit of FIG. 2 using an active sensing structure.
Figure 4B:
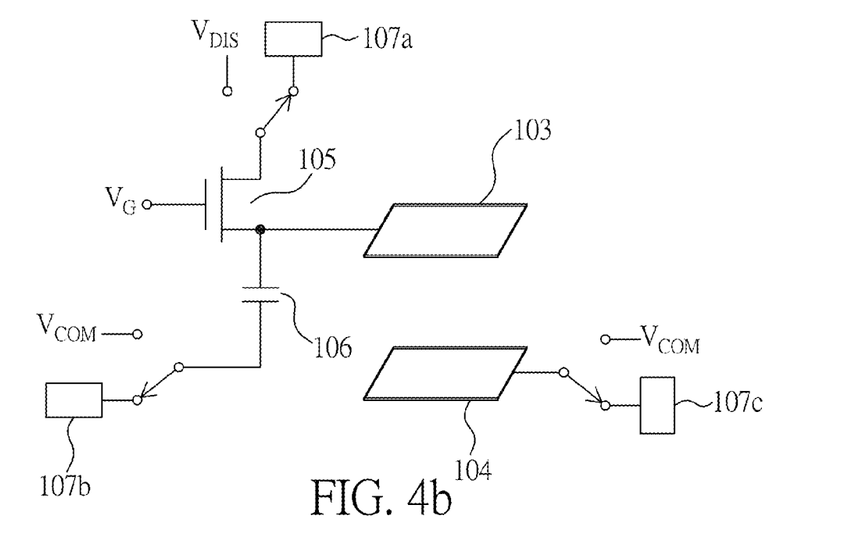

Please refer to FIG. 4a, which illustrates an embodiment of the sensor unit 100 of the present invention in an active sensing structure. In FIG. 4a, the sensor unit 100 includes a plurality of sensors 103 implemented by a plurality of pixel electrodes of a display structure (the display structure can be a liquid crystal display structure, an electronic paper display structure, or an organic light emitting display structure), that is, the pixel electrodes of the display structure also serve as touch sensors. Please refer to FIG. 4b, which illustrates an embodiment of a driving circuit of the sensor unit 100 of FIG. 4a. As illustrated in FIG. 4b, the driving circuit includes a sensor 103 (a pixel electrode of the display structure), an opposing electrode 104, a transistor 105, a storage capacitor 106, and touch detection circuits 107a-107c. When in operation, if the sensor 103 is to be in use, the transistor 105 will be turned on, and the touch detection circuits 107a-107c will be included to perform a touch detection procedure. Besides, in the structure of FIG. 4b, the opposing electrode 104 can also serve as a sensor, and the opposing electrode 104 and the pixel electrode can oppose each other vertically or the opposing electrode 104 can neighbor the pixel electrode on an approximately same plane.

Figure 5A:
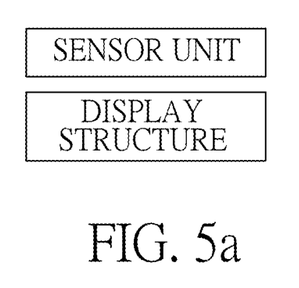
FIG. 5a-5e illustrate various embodiments of a sensor unit integrated with a display structure of the present invention.
Figure 5B:
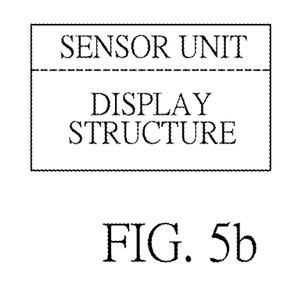
Figure 5C:
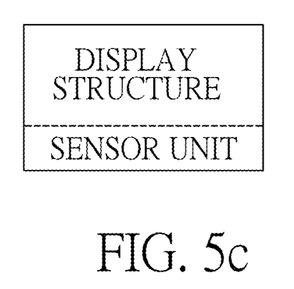
Figure 5D:
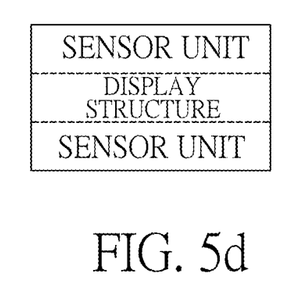
Figure 5E:
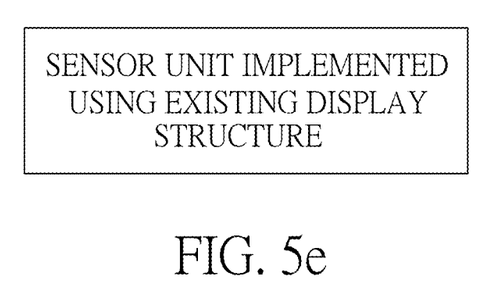

Please refer to FIG. 5a-5e, which illustrate embodiments of the sensor unit in combination with a display structure according to the present invention. In FIG. 5a, a sensor unit is attached on a display structure; in FIG. 5b, a sensor unit is formed at a upper location inside a display structure; in FIG. 5c, a sensor unit is formed at a upper location inside a display structure and another sensor unit is formed at a lower location inside a display structure; in FIG. 5e, a sensor unit is formed using existing display electrodes or existing signal lines of a display structure.

Figure 6A:
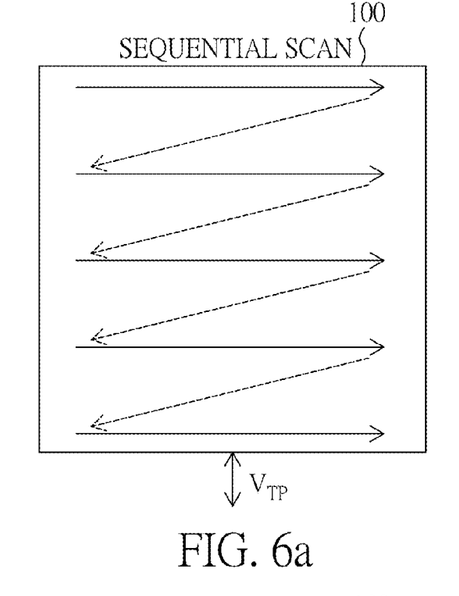
FIG. 6a-6d illustrate various touch scan modes that can be provided with the design of the present invention.
Figure 6B:
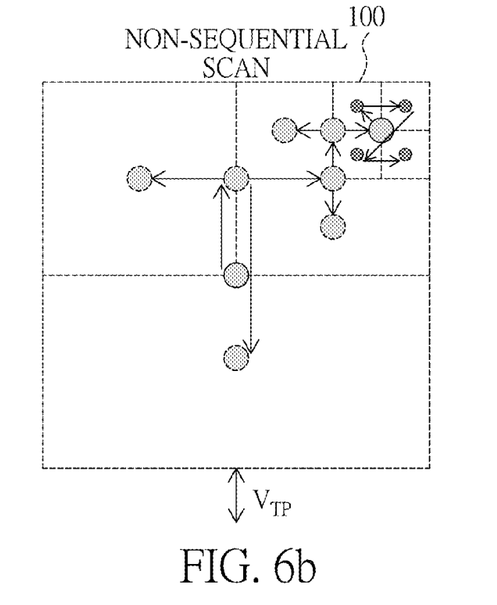
Figure 6C:
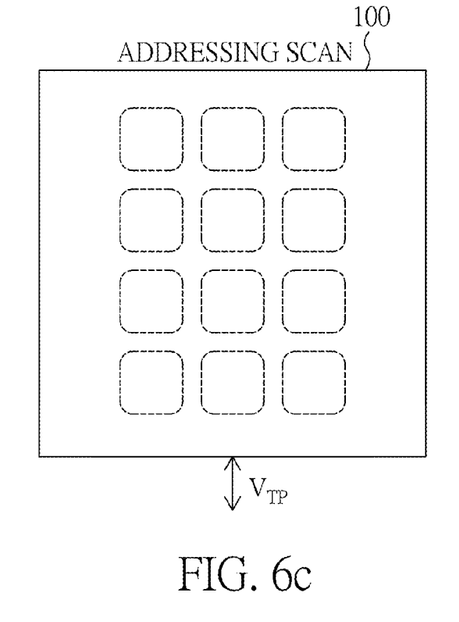
Figure 6D:
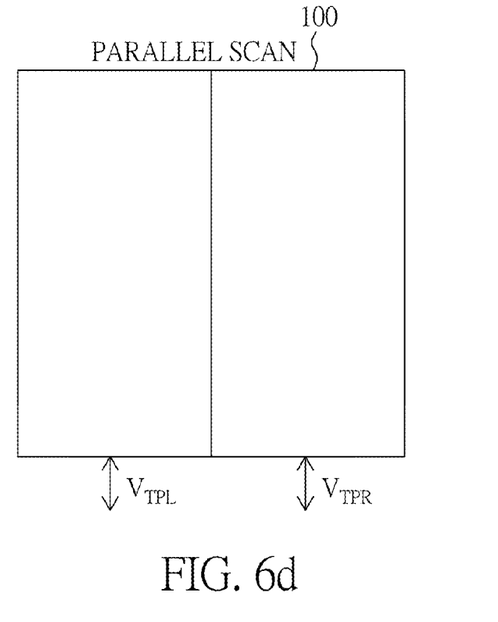

Please refer to FIG. 6a-6d, which illustrate touch scan modes that can be provided by the present invention. In FIG. 6a, a sequential scan mode is illustrated; in FIG. 6b, a non-sequential scan mode is illustrated; in FIG. 6c, an addressing scan mode is illustrated; and in FIG. 6d, a parallel scan mode is illustrated.

Figure 7:
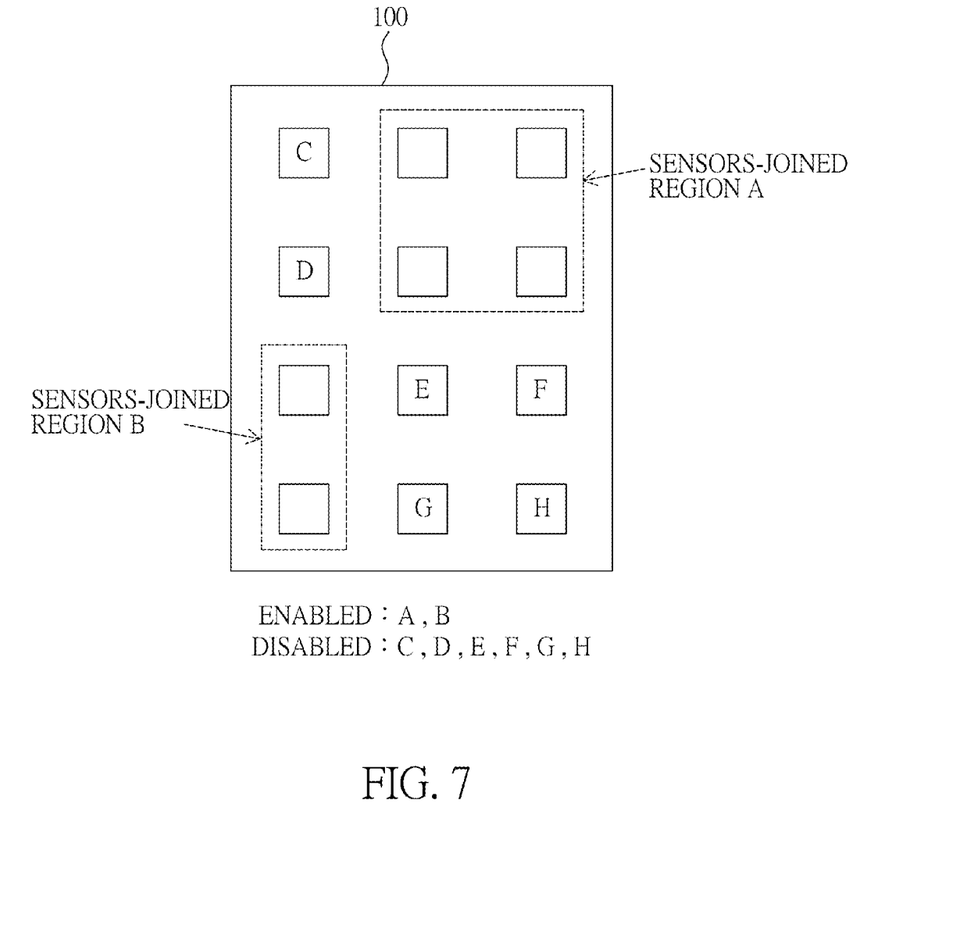
FIG. 7 is an illustrative diagram showing a configurable touch detection function that can be provided with the design of the present invention.

Please refer to FIG. 7, which illustrates a configurable touch function provided by the present invention. As illustrated in FIG. 7, the sensor unit 100 is divided into a sensors joined region A, a sensors joined region B, and sensors C-H, wherein the sensors joined region A and the sensors joined region B are enabled and the sensors C-H are disabled. In fact, with the design of the present invention, we can easily define an area and an enabled/disabled state of each sensing region of the sensor unit 100 simply by determining a content of the control table. That is, the present invention can easily support different algorithms by its novel configurable architecture to meet different touch requirements—for example, a touch requirement of operating on a graphic user interface, or a touch requirement of dynamically determining a detection strategy according to a previous piece of the touch information or an operational trend derived from multiple previous pieces of the touch information.

As a result, the present invention is capable of providing the advantages as follows:

1. The touch system using a processor to configure a touch detection architecture of the present invention is capable of determining a sensors joined configuration of a plurality of sensors of a sensor unit according to a control table.

2. The touch system using a processor to configure a touch detection architecture of the present invention is capable of determining a scan address range and a scan mode of a touch scan unit according to the control table, the scan address range being corresponding to an addressing space of the sensors joined configuration of the sensor unit.

3. The touch system using a processor to configure a touch detection architecture of the present invention is capable of determining an operation mode of a touch detection unit according to the control table to derive touch information.

4. The touch system using a processor to configure a touch detection architecture of the present invention is capable of using a touch control unit to deliver respective control signals to the sensor unit, the touch scan unit, and the touch detection unit to perform an adaptive touch detection procedure, so as to satisfy requirements of various touch applications.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch system using a processor to configure a touch detection architecture, including:
    a sensor unit having a plurality of sensors;
    a connection unit, having a plurality of switches and at least one common contact, each of the plurality of switches having a control end, a first connection end, and a second connection end, wherein, each the control end is coupled with a connection control signal, each the first connection end is coupled with one of the plurality of sensors, and each the common contact is coupled with a plurality of the second connection ends;
    a touch scan unit, having at least one scan control end, at least one first signal connection end, a plurality of second signal connection ends, and at least one third signal connection end, the at least one scan control end being coupled with at least one scan configuration signal, each the first signal connection end being coupled with a touch signal, the plurality of second signal connection ends being coupled to the first connection ends of the connection unit, and the at least one third signal connection end being coupled to the at least one common contact of the connection unit, wherein, each the first signal connection end is coupled to one of the plurality of second signal connection ends or one of the at least one third signal connection end under a control of the at least one scan configuration signal;
    a touch detection unit, having at least one operation mode control end, at least one touch detection end, and at least one touch information output end, the at least one operation mode control end being coupled with at least one operation mode configuration signal, each the touch detection end being used to output the touch signals and derive a parameter from each of the touch signals, and the at least one touch information output end being used to output touch information, wherein the touch information is generated according to the parameter from each of the touch signals; and
    a processor unit, used to output the at least one connection control signal, the at least one scan configuration signal, and the at least one operation mode configuration signal according to a content of a control table, and receive the touch information.

2. The touch system using a processor to configure a touch detection architecture as claim 1, wherein the plurality of sensors of the sensor unit are disposed in a two-dimensional array.

3. The touch system using a processor to configure a touch detection architecture as claim 1, wherein the switches of the connection unit are implemented by transistors.

4. The touch system using a processor to configure a touch detection architecture as claim 1, wherein the parameter is selected from a group consisting of voltage, current, frequency, and phase, and the touch information is derived by performing an analog-to-digital conversion on the parameter.

5. The touch system using a processor to configure a touch detection architecture as claim 1, wherein the parameter is selected from a group consisting of voltage, current, frequency, and phase, and the touch information is derived by performing an analog-to-digital conversion and a touch decision procedure on the parameter.

6. The touch system using a processor to configure a touch detection architecture as claim 1, wherein the control table includes at least one block division byte and at least one enable/disable byte.

7. The touch system using a processor to configure a touch detection architecture as claim 1, wherein the control table has a content determined according to a control algorithm.

8. The touch system using a processor to configure a touch detection architecture as claim 7, wherein the control algorithm determines the content of the control table according to a graphic user interface.

9. The touch system using a processor to configure a touch detection architecture as claim 7, wherein the control algorithm determines the content of the control table according to at least one piece of the touch information.

10. The touch system using a processor to configure a touch detection architecture as claim 1, wherein the touch scan unit determines a scan mode according to a content of the at least one scan configuration signal, the scan mode being selected from a group consisting of a sequential scan mode, a parallel scan mode, and an addressing scan mode.

11. The touch system using a processor to configure a touch detection architecture as claim 1, wherein the touch detection unit performs a touch detection procedure determined by a content of the at least one operation mode configuration signal, the touch detection procedure being selected from a group consisting of a self-capacitive detection procedure, a mutual-capacitive detection procedure, a photo interrupt detection procedure, a pressure change detection procedure, a resistance change detection procedure, a frequency change detection procedure, and a hybrid signal detection procedure.

12. The touch system using a processor to configure a touch detection architecture as claim 1, wherein the control table further includes at least one detection sensitivity setting byte for controlling a detection sensitivity profile of the touch detection unit via determining a content of the at least one operation mode configuration signal.

13. The touch system using a processor to configure a touch detection architecture as claim 1, wherein the control table further includes at least one byte for setting detection weightings.

14. The touch system using a processor to configure a touch detection architecture as claim 1, wherein the control table further includes at least one byte for setting a number of repeating detection times.

15. The touch system using a processor to configure a touch detection architecture as claim 1, wherein the sensor unit is located in a display.

16. The touch system using a processor to configure a touch detection architecture as claim 15, wherein the sensor unit is implemented by using a plurality of display electrodes or a plurality of signal conducting lines of the display.

17. The touch system using a processor to configure a touch detection architecture as claim 1, wherein the sensor unit is integrated with a display to form a touch display.

* * * * *